United States Patent
Doan et al.

(10) Patent No.: US 8,164,420 B2
(45) Date of Patent: Apr. 24, 2012

(54) TRANSIENT STATE INFORMATION DISPLAY IN AN RFID TAG HAVING A CHARGE-INDUCED PIGMENT RELEASE MEDIUM

(75) Inventors: Christopher Hoang Doan, Austin, TX (US); Richard Redpath, Cary, NC (US); Steven Michael Miller, Cary, NC (US); Gene Wayne Cherry, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 12/202,565

(22) Filed: Sep. 2, 2008

(65) Prior Publication Data

US 2010/0052909 A1 Mar. 4, 2010

(51) Int. Cl.
*G08B 13/14* (2006.01)
*G08B 3/00* (2006.01)
*G05B 19/00* (2006.01)
*H04Q 5/22* (2006.01)

(52) U.S. Cl. .............. 340/5.91; 340/572.1; 340/10.1; 340/691.6; 340/13.31

(58) Field of Classification Search .......... None
See application file for complete search history.

(56) References Cited

U.S. PATENT DOCUMENTS

| 5,413,739 | A | 5/1995 | Coleman | |
|---|---|---|---|---|
| 6,501,587 | B1 | 12/2002 | Ferraris et al. | |
| 2002/0091991 | A1* | 7/2002 | Castro | 717/106 |
| 2004/0148117 | A1* | 7/2004 | Kirshenbaum et al. | 702/82 |
| 2005/0259313 | A1* | 11/2005 | Wang et al. | 359/296 |
| 2006/0071925 | A1* | 4/2006 | Wykoff et al. | 345/211 |
| 2006/0087436 | A1 | 4/2006 | Reddy et al. | |
| 2006/0145859 | A1 | 7/2006 | Posamentier | |
| 2006/0145865 | A1 | 7/2006 | Forster | |
| 2007/0070032 | A1* | 3/2007 | Chung et al. | 345/107 |
| 2010/0014149 | A1* | 1/2010 | Kaga et al. | 359/296 |
| 2010/0225444 | A1* | 9/2010 | Nobutsugu et al. | 340/5.91 |

* cited by examiner

*Primary Examiner* — Toan N Pham
*Assistant Examiner* — Fekadeselassie Girma
(74) *Attorney, Agent, or Firm* — Jeffrey S. LaBaw; David H. Judson (57) ABSTRACT

An RFID tag includes a sensor for determining a transient state or condition of a product to which the tag is associated, and a display. The tag may be passive, semi-passive, or active. In response to receipt at the tag of a read signal that includes a first value associated with the transient state or condition, a comparison is performed. The comparison compares the first value, with a second value generated by the sensor in response to receipt of the read signal. As a result of the comparison, an indication is provided on the display. The information displayed is a function of the comparison. In one embodiment, the display provides different color indications depending on the transient state or condition sensed. In an alternative embodiment, the RFID tag display includes an electrical or thermal charge-induced pigment release medium, e.g., an electronic ink, and the tag is used to communicate information about the state of a product to which the tag is associated.

26 Claims, 4 Drawing Sheets

TRANSIENT STATE INFORMATION DISPLAY IN AN RFID TAG HAVING A CHARGE-INDUCED PIGMENT RELEASE MEDIUM

BACKGROUND OF THE INVENTION

1. Technical Field

The present invention relates generally to the monitoring and display of state information in radio frequency identification (RFID) devices.

2. Background of the Related Art

Radio frequency identification (RFID) is a means of identifying a unique object or person using a radio frequency transmission. It comprises tags (or transponders), which store information that can be transmitted wirelessly, and readers (or interrogators), that read/write information from/to tags. Tags can be read remotely via a radio frequency signal from a reader over a range of distances. A passive tag, which does not include a battery or other power source, can only send information back to the reader on the reflected signal. RFID tags differ in the frequencies used, typically ranging from 100 kHz (e.g., access control) to 2.45 GHz (item management), in power consumption, memory (read-only, write-once, read-write with user memory), and in their computational capabilities. There are many applications and uses of RFID technology, including supply-chain management, electronic tolls, item tracking, user identification, passports, implants, and many more.

BRIEF SUMMARY OF THE INVENTION

An RFID tag includes a sensor for determining a transient state or condition of a product to which the tag is associated, and a display. The tag may be passive, semi-passive, or active. In response to receipt at the tag of a read signal that includes a first value associated with the transient state or condition, a comparison is performed. The comparison compares the first value with a second value generated by the sensor in response to receipt of the read signal. As a result of the comparison, an indication is provided on the display. The information displayed is a function of the comparison. Thus, in one embodiment, transient state or condition is the "age" of the product relative to a system time value. In this example, the first value is a current time value, and the second value is an expiration date that is encoded in or otherwise read from the product. If the product is fresh, a first color LED is actuated. If the product is nearing its expiration date, a second color LED is actuated. If the product is out-of-date, a third color LED is actuated. In alternative embodiments, the transient state or condition data is of various types including, without limitation, product age, weight, volume, moisture content, density, and so forth. The transient state data may also relate to the condition of the tag itself.

According to another aspect, an RFID tag comprises, in combination, a sensor, a display, a processor, and a set of program instructions executable by the processor to perform the condition responsive testing and display functions described above.

According a further aspect, an RFID system comprises a reader, and at least RFID tag that performs the above-described functionality.

According to yet another aspect, an enterprise RFID system comprises an RFID edge controller, one or more reader devices, and at least one RFID tag that carries out this testing and display functionality.

In an alternative embodiment, the RFID tag display includes an electrical or thermal charge-induced pigment release mechanism, and the tag is used to communicate information about a state of a product to which the tag is associated in the manner described above. One such charge-induced pigment release mechanism is an electronic ink that comprises microcapsules, for example, positively-charged white (or black) particles and negatively-charged black (or white) particles, suspended in a clear fluid. When an electric field is applied, one of the particle types moves to the top of the fluid to become visible. In this manner, the RFID tag displays an indication about a state of the product to which the RFID tag display is associated The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
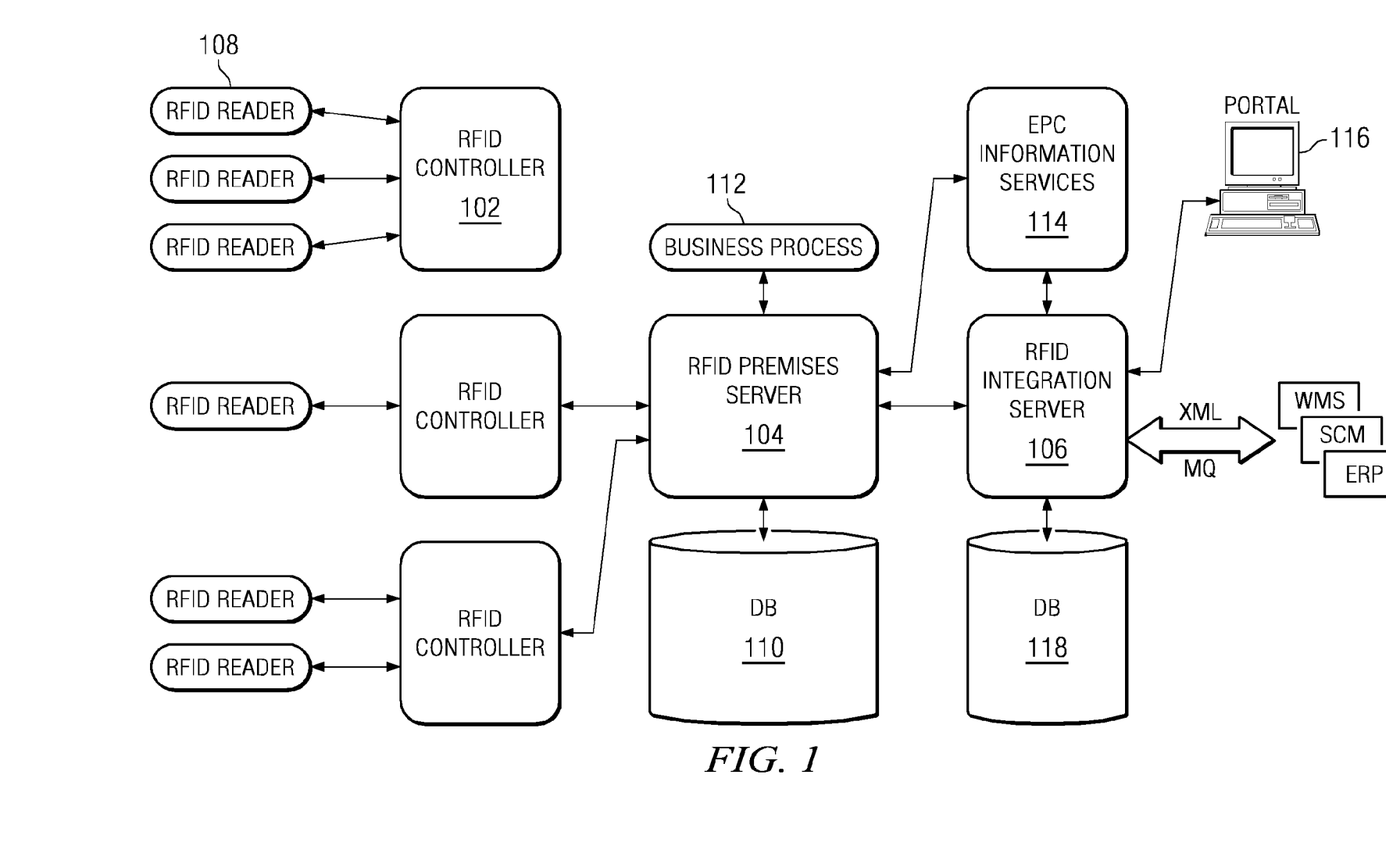
FIG. 1 depicts a known enterprise RFID system in which the subject disclosure may be implemented.

FIG. 1 illustrates a representative architecture of an enterprise RFID system 100. It comprises three (3) primary components: an RFID controller 102, an RFID premises server 104, and an RFID integration server 106. The RFID controller is sometimes referred to as an "edge" controller because it is a device located at the edge of the RFID system. Typically, the RFID controller 102 is a network node that controls a set of reader devices for the environment. Thus, for example, in an inventory control system, the RFID controller is connected to one or more readers 108, where each reader monitors and controls a set of input/output devices for a door. These input/output devices (not shown) may include, for example, a motion sensor, antennae, a light tree, and the like, depending on the application. The RFID controller 102 supports the following functions: connectivity, either synchronous or asynchronous; software deployment, including device drivers, filters and aggregators, and dynamically loading software modules; security, including authenticating readers; filtering of noise and incomplete data reads. The premises server 104 is a web server typically located at the premises of the store or distribution center at which the inventory management functions are being implemented. The premise server acts as an intermediary between the edge devices (the RFID controllers) and the backend enterprise servers. The premises server typically includes an administrative console with which an operator can configure and manage the RFID system according to a premises application. The premises server can also optionally be set up to perform additional tag processing.

As shown in FIG. 1, typically there are several RFID controllers 102, and one or more RFID readers 108 are connected to each RFID controller 102. Of course, each RFID reader 108 is responsible for reading a plurality of tags to provide the basic RFID functionality. The RFID premises server 104 supports all of the functions of the RFID controller 102, and the server 104 adds persistence to store incoming RFID events. The premises server 104 also acts as a controller for the attached RFID controllers 102 by passing commands and data to the network of attached controllers using synchronous/asynchronous communication. The premises server typically is also a central access point for RFID-related data at the premises for network management, which data may be stored in database 110. The premises server 104 may also provide support for management of business process 112 (e.g., such as the manual coding of simple process logic as a session enterprise JavaBean component), and it acts as a gateway into EPC (electronic product code) Information Services 114 that can be accessed either locally or remotely. As a gateway, the premises server 104 typically employs an HTTP or database lookup method, although it may also use more complicated logic, such as a service federation or database joins. The premises server 104 may also act as a gateway to the RFID integration server 106 by sending and receiving commands and data from the server using synchronous/asynchronous methods. The RFID integration server 106 supports the functions of the premises server. In addition, the integration server 106 may provide process and data integration, including the ability to enrich RFID data from existing sources and to cleanse or validate such data. The integration sever 106 can integrate business-to-business (B2B) processes so that the system can offer the RFID-related data to partners, e.g., along a supply chain. The integration server 106 also provides the ability to integrate various GUIs so that data from RFID sources can be displayed. A web-based portal 116 is used to provision or interact with the integration server 106. The integration server 106 has a database 118 associated therewith for storing data.

A representative premises server comprises IBM® WebSphere® Application Server, DB2 Workgroup Server, WebSphere MQSeries, WebSphere Connection Server Micro Edition, Services Management Framework, and a Web application for the administrative console. The IBM WebSphere RFID solution provides Tivoli Resource Models for WebSphere Application Server, DB2, and MQSeries for monitoring the premises server. A representative RFID controller uses WebSphere Connection Server Micro Edition to send messages to the readers and the premises application that executes on the premises server. The premises application may use WebSphere MQSeries to send messages to the controller and customer backend. Typically, the edge software comprises one or more agents that are delivered as OSGi bundles and activated on the edge device. These agents facilitate the delivery of tag information, which is captured by the edge device from the I/O devices, and delivered to the premises server through WebSphere Connection Server Micro Edition. As mentioned above, the premises server may provide additional processing for tags, as well as tools with which operators can configure and manage the RFID system.

IBM WebSphere RFID supports different controller devices, such as the Arcom Viper. Edge components typically also include reader adapters (API-level interfaces that allow access to RFID reader functions), reader agents (modules for connecting reader adapters to WebSphere Connection Server Micro Edition), I/O adapters (API-level interfaces that allow access to I/O device functions), I/O agents (modules for connecting I/O adapters to WebSphere Connection Server Micro Edition), filter agents (modules for filtering and aggregating tag data before passing the data to WebSphere Connection Server Micro Edition and up to the premises server), a controller agent (a module that coordinates actions on the edge device). Of course, the above-identified components are merely representative, and the subject disclosure is not limited to any particular RFID system or implementing RFID technology.

Figure 2:
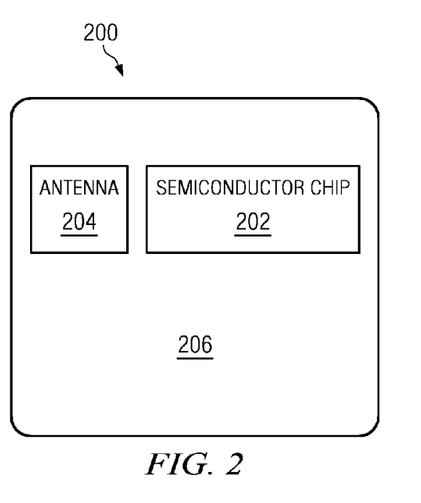
FIG. 2 depicts a passive RFID tag in which the techniques described below may be implemented.
Figure 3:
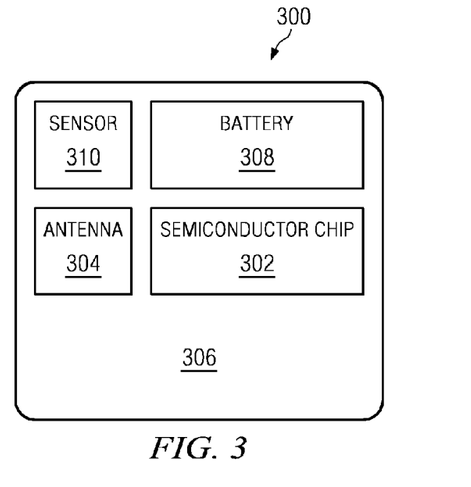
FIG. 3 depicts a semi-passive RFID tag in which the disclosed techniques may be implemented.
Figure 4:
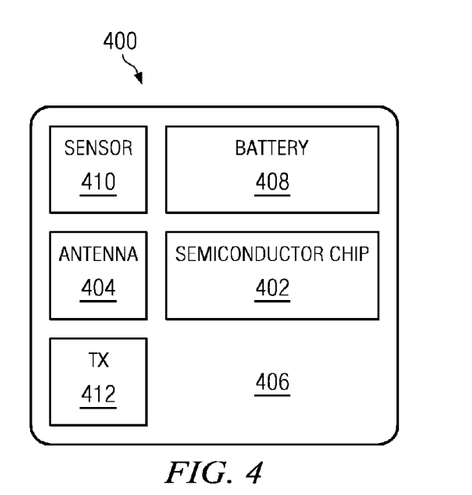
FIG. 4 depicts an active RFID tag in which the invention may be implemented.

The RFID system, such as the system 100 in FIG. 1, comprises tagged objects. The tag responds to the radio waves emanating from the reader/programmer antenna. In a representative embodiment, a passive tag 200 comprises a semiconductor chip 202, an antenna 204, and the housing (packaging) 206 that holds them. Inductive coupling (also known as near field coupling) is used for short-range reading purposes; propagating electromagnetic waves (known as far field coupling) is used for longer-range reading. As can be seen, the simplest passive tags such as shown in FIG. 2 have neither batteries nor transmitters. A tag of this type typically carries a unique identification number in its memory. Currently, EPC tags use a 96-bit ID code, which can be expanded if necessary. The semiconductor chip 202 in the tag derives its power from the radio field of the reader. In particular, the tag communicates with the reader by reflecting and modulating a signal returned to the reader. A tag 200 may have provisions for extended "read/write" memory. Because each tag has a unique ID, the reader may be able to recognize many tags in its field virtually simultaneously, e.g., up to about 1000 tags per second. Typically, ultra-high-frequency (UHF) tags may be read at a distance of approximately 10 meters (30 feet). In addition to simple passive tags such as shown in FIG. 2, another type of tag is shown in FIG. 3. The tag 300 comprises housing 306 and is a battery-assisted tag, sometimes called a semi-passive or a semi-active tag, in which a battery 308 is used to power the semiconductor chip 302. The tag 300 includes antenna 304 and may have a range of about 30 meters (100 feet). Battery-assisted tags may also have one or more sensors 310 to measure and record parameters, such as temperature or pressure. Yet another RFID tag is an active tag 400, such as shown in FIG. 4. Like the previous examples, tag 400 comprises housing 406 that includes chip 402 and antenna 404. This tag includes a battery 408, a sensor 410, and a transmitter 412. These tags, which may be detected at approximately 100 meters (300 feet), are generally used to locate people or objects.

Figure 5:
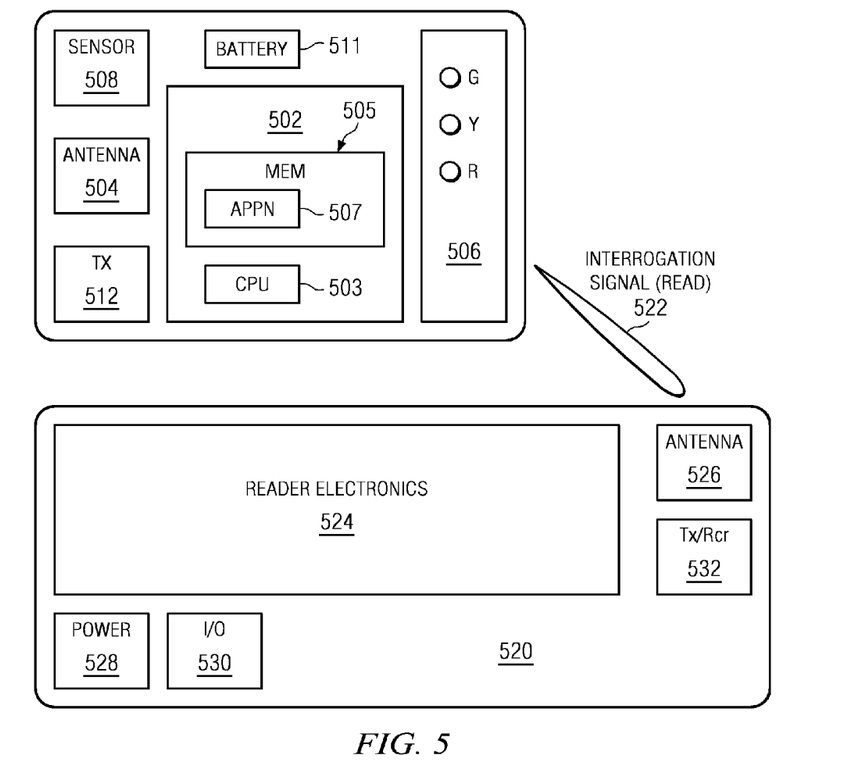
FIG. 5 illustrates an embodiment on RFID tag that provides the inventive method.

A tag 500 for use according to the present invention is shown in FIG. 5. The tag comprises circuitry 502, an antenna 504, and a display 506 coupled to the semiconductor circuitry 502. The circuitry 502 comprises a variety of electrical components such as resistors, capacitors and inductors, as well as one or more electronic components, such as batteries, memory devices and processors. In one embodiment, the circuitry comprises processor 503, memory 505, and an associated control program 507. The antenna 504 may be of any type, e.g., dipole, loop, slot, coil, or hybrid structures. A transmitter 512 may be included. The tag may operate at any particular RFID frequency and with any particular type of reader. The tag may be passive, semi-passive, or active. The display 506 may be of any type, e.g., light emitting diodes (LED), liquid crystal display (LCD), organic light emitting (OLED), organic electro-luminescent (OEL), light emitting polymer (LEP), or the like. More generally, the tag display may be formed from any solid state materials including, without limitation, electro-chromic, thermo-chromic, electro-luminescent, plasma-based, or other chemically-reactive materials. In one simple embodiment, the display 506 comprises a set of three (3) light emitting diodes, e.g., green (G), yellow or amber (Y) and red (R). Of course, elements of any particular color may be used. All elements may be of the same color but merely have different cycles of illumination, different intensities, or any other physical characteristics that can provide the desired indications. A battery 511 may be used to power the tag, although the tag may also be passive.

The tag 500 also includes sensor 508 that understands a given state or property value associated with the tag. The type of sensor will depend on the given state or property value being sensed. Examples of commercial sensors include those available from vendors such as Alien Technology, Arcom Control Systems, CAEN, S.p.A., FEIG Electronic, Impinj, Motorola, Reva Systems, Sirit Technologies, TagSys and Wavetrend. Sensor 508 is coupled to the processor 503, which as noted above executes control program 507 that is stored in memory 505. The control program 507 comprises a set of executable (machine-readable) program instructions. Thus, for example, in one embodiment, the given state of property value is an expiration date associated with the tag, or with respect to a product to which the tag is associated. In an inventory management scenario, the tag sensor 508 is being used by the RFID system to monitor whether a given tagged product (e.g., food, medicine, or some other perishable) has a certain time value relative to a system time. In a typical use case, the tag sensor 508 provides an indication of whether the tagged product is out-of-date or has "expired" vis-à-vis a given system timestamp. Thus, if the tagged product is a particular food product or a pharmaceutical, the tag sensor provides temporal information to the RFID system regarding whether the product is, e.g., fresh, nearly out-of-date, out-of-date, or the like. More generally, the tag sensor provides data about a given state or characteristic associated with the product. Preferably, that data is exposed to the system by a reader 520, which is programmed by the premises (or other application) to generate a signal 522 to the tag sensor 508. The signal includes or encodes a data value, e.g., a current timestamp, and this data value is compared to the expiration date time value that is made available to the tag sensor. As a result of this comparison, a given condition exists. The reader 520 is an off-the-shelf device comprising reader electronics 524 that send and receive signals via antenna 526 and transmitter/receiver 532. The device electronics (e.g., processor, memory, software, logic circuitry, and the like) are powered by power supply 528. I/O functions are handled by I/O module 530. Thus, for example, a comparison of the current timestamp and the expiration date time value may indicate that the product is still fresh, or that the product is approaching some date after which the product is no longer fresh, or that the product is already out-of-date, or the like. As a result of this determination, the processor is controlled to cause the tag display to provide a given indication. Thus, in the case where the tag display is a set of light emitting diodes (green, yellow and red), a green LED is actuated if the product is still fresh, a yellow LED is actuated if the product is approaching its expiration date, and a red LED is actuated if the product is already out-of-date.

The reader 520 typically is an off-the-shelf device comprising reader electronics 524 that send and receive signals via antenna 526 and transmitter/receiver 532. The device electronics (e.g., processor, memory, software, logic circuitry, and the like) are powered by power supply 528. I/O functions are handled by I/O module 530. Representative reader devices include, for example, those available from vendors such as Alien Technology, Arcom Control Systems, CAEN, S.p.A., FEIG Electronic, Impinj, Motorola, Reva Systems, Sirit Technologies, TagSys and Wavetrend.

One of ordinary skill will appreciate that the nature of the displayed indication will vary in accordance with the display type, available hues, the content of the message to be displayed, and so forth. Indeed, in a simple fresh/not fresh display, a "fresh" product may be indicated with no illumination whereas an out-of-date product is indicated with just a flashing light. The particular colors displayed may vary over a continuum, with each hue being associated with a given condition of the product along that continuum. In another embodiment, the intensity of a single color may be varied to indicate the various conditions of the product as sensed by the on-board tag sensor. In yet another embodiment, the output may be aural, or a combination of aural and visual outputs.

Figure 6:
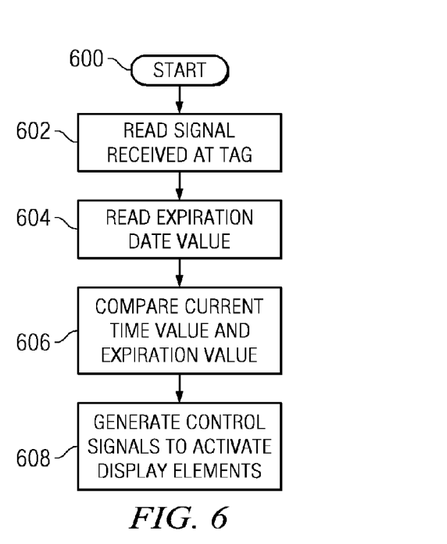
FIG. 6 is a process flow of a tag interrogation method according to the present invention.

FIG. 6 illustrates a process flow for a tag sensor control program that provides the above-described timestamp testing functionality. Of course, a similar functionality may be implemented for other state conditions. As described above, this program is stored in tag memory and is executable by a processor or other equivalent logic in the tag. The program itself may be downloaded to a passive tag in conjunction with the read signal. The tag is also assumed to have a sensor that provides the expiration (or other time value) data. If the tag is powered, the program is assumed to be running at step 600, waiting for receipt of a read signal from a reader. If the tag is not powered, the program is inactive. At step 602, a read signal has been received. In the temporal state embodiment, the read signal includes a current time value. If the tag is not powered, the receipt of this signal powers up the device. At step 604, the processor reads the expiration date value from the sensor (in this particular embodiment). This data may be cached in memory if it has been read from the sensor previously. At step 606, a comparison is made of the current time value extracted from the read signal and the expiration data obtained from the sensor. As a result of this comparison, step 608 provides one or more control signals to the tag display to provide an indication of a transient state of the RFID tag age. This completes the processing.

The present invention is not limited to processing and display of temporal state information. Indeed, the principles may be extended generally to cover the sensing of many other states or characteristics of the product associated with the tag (or, for that matter, of the tag itself). Thus, e.g., in one variant, the sensor is used to determine a temperature of the product; when the read signal (which includes a temperature value) requests a temperature read-out, a comparison of the received and sensed values is used to generate a visual temperature (or temperature change) indication, as previously described. In another example, the weight of the product is sensed and compared against a weight value provided by the reader to generate a display indication. In another example, the moisture content of the product is sensed and compared against a moisture content value provided by the reader to generate a display indication. In still another variant, the volume of the product is sensed, and so forth. As can be seen then, any temporal or physical state or characteristic (or characteristics) may be sensed and compared to values included (or encoded) in the read signal. If more than one display in incorporated on the tag, multiple display indications may be provided. Thus, e.g., the read signal may include a first value associated with a first characteristic (e.g., time), a second value associated with a second characteristic (e.g., a physical characteristic), and so forth; in such case the comparison of the first value with a sensed time value generates a first display (e.g., actuation of a yellow LED) while the comparison of the second value with a sensed physical condition value generates a second display (e.g., actuation of a text display that provides the message "dry").

The various examples set forth above involving perishables are not meant to be limiting of course. The techniques described herein may be used with any type of product. The product may be a food product, or any other type of product that has a useful lifetime, such as a battery, a chemical, or the like. Moreover, the techniques may be used to identify when a product (e.g., a tire) is not within a given tolerance or specification. Further, a given physical characteristic (e.g., a low weight value) may provide a secondary indication about the equipment that was used to manufacture or package the product. The temperature or physical characteristic values may indicate the likely condition of the product.

As can be seen then, generally the subject disclosure provides an RFID interrogation method that includes the following basic steps: (a) in response to receipt at a tag of a read signal that includes a first value associated with a given characteristic, comparing the first value with a second value generated at the tag in response to receipt of the read signal, and (b) providing from the tag a display indication that is a function of the comparison. As noted above, the given characteristic may be temporal-based, or based on a given physical characteristic (e.g., temperature, weight, moisture content, volume, density, or the like), depending on the product and the RFID application. The display indication will depend on the type of display, the available hues, the nature of the message, and so forth. The present invention should not be limited to any particular tag, temporal or physical characteristic, tag sensor, tag display, display indication type/message, RFID application, or the like.

Thus, in one aspect, the RFID tag includes a conventional display (such as a set of LEDs) indicating state. The use of conventional displays, however, is not a limitation, as a given RFID tag may include other types of known or later-developed display technologies. Thus, one such RFID tag includes an electrical charge-induced pigment release capability that causes permanent, semi-permanent or even transient changes to the actual tag appearance. As with the other embodiments described above, these tag operations can be carried out with or without any inherent power source, such as with power being derived from the read signal to the tag. One type of electrically-induced pigment release is known as electronic ink. A known electronic ink comprises tiny microcapsules, with each microcapsule including positively charged white particles and negatively charged black particles suspended in a clear fluid. When a negative electric field is applied, the white particles move to the top of the microcapsule to become visible. At the same time, an opposite electric field pulls the black particles to the bottom of the microcapsules where they are hidden. By reversing this process, the black particles appear at the top of the capsule, which now makes the surface appear dark at that spot. To form an electronic display, the ink is printed onto a sheet of plastic film laminated to circuitry. The circuitry forms a pattern of pixels that can then be controlled by a display driver or the like. The microcapsules are suspended in a liquid "carrier medium," thereby allowing them to be printed using existing screen printing processes onto the surface of the RFID tag.

Electronic inks may also be used to create color displays.

Using this general approach, a variation of the above-described embodiment uses an RFID tag having an electrical charge-induced pigment release capability. One or more of the previously described techniques for interrogating or reading the tag may be used to determine a given state or condition, as has been previously described. By applying a plastic film laminate to the device housing (or to circuitry within the tag), the tag can be made to provide a variety of condition-responsive indications. Thus, e.g., the tag may be controlled to change color completely (such as by turning red, to indicate expiration). In an alternative, a large X or other letter or symbol may be generated, indicating usage or cancellation of the tag, or of a product associated with the tag. In still another example, the tag may identify sequential markings, with each use marked off in sequence (e.g., a number of usages of a multi-day admission ticket). There are many use cases for this type of RFID tag, such as an RFID tag that also serves as a visible price tag. Using an RFID scanner/reader, the price may be changed for "SALE" or "CLEARANCE" items, e.g., by signaling the RFID tag to alter the price displayed on the surface of the tag. When the sale is over, tags could be remotely reprogrammed to again show the normal price (without the manual process of marking or retagging each item).

In addition, another type of information that may be read from the tag is the number of tag reads, or other such commands issued by a device.

Figure 7:
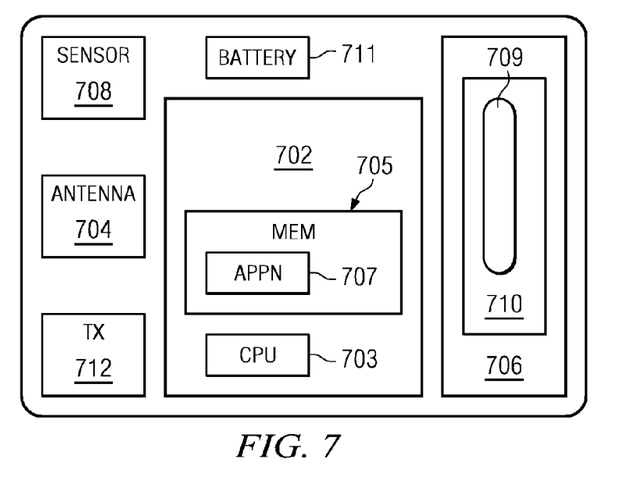
FIG. 7 is an alternative RFID tag that includes a display having an electrical charge-induced pigment release mechanism.

FIG. 7 illustrates an alternative embodiment of the RFID tag that includes an electrical or thermal charge-induced pigment release medium. The tag 700 comprises circuitry 702, an antenna 704, and a display 706 coupled to the semiconductor circuitry 702. Tag sensor is shown as reference numeral 708, as described above. As also previously described, preferably the circuitry 702 comprises a variety of electrical components such as resistors, capacitors and inductors, as well as one or more electronic components, such as batteries, memory devices and processors. In this embodiment, the circuitry comprises processor 703, memory 705, and an associated control program 707. The antenna 704 may be of any type, e.g., dipole, loop, slot, coil, or hybrid structures. A transmitter 712 may be included, as described in the earlier embodiment. The tag may operate at any particular RFID frequency and with any particular type of reader, and once again the tag may be passive, semi-passive, or active. In this alternative embodiment, however, the tag display 706 comprises an electronic ink 709 is laminated onto a sheet 710 of plastic film that itself is laminated (or otherwise affixed) to the circuitry (or some portion thereof) previously described. The electronic ink may comprise microcapsules suspected in a liquid carrier, as also previously described. Alternatively, the ink may be formed of a thermochromic material. More generally, the display surface may comprise any form of electrically- or thermally-conductive particles (or sets of particles of various types or pigments) dispersed in any suitable carrier medium, where the application of an electrical or thermal potential across (or adjacent) the surface generates an electrochromic or thermochromic effect at the interface to cause a change in the display state. There may be multiple (e.g., overlapping) layers of pigment release materials, multiple areas of discrete pigment release materials, and the like, as needed to produce the desired display effect. Of course, multiple pigments may be used so the black/white, grayscale or color effects may be achieved.

Figure 8A:
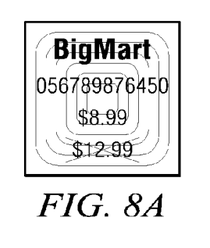
FIG. 8A-8C shows several examples of how the alternative RFID tag display may be used according to the subject matter described herein.
Figure 8B:
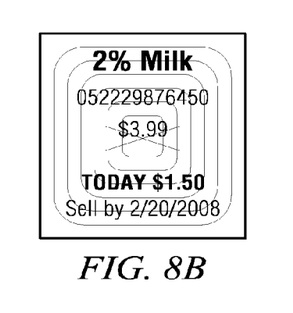
Figure 8C:
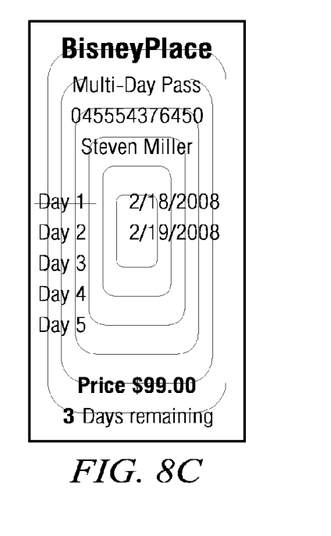

FIG. 8A illustrates one example display tag. In this example, the RFID tag is designed to display a different price after a certain time period has elapsed. Here, the original $12.99 price has been excised (using a red X mark) and the new $8.99 price exposed. FIG. 8B illustrates a second example, where the new price is shown in association with a "Sell by DATE" indication that is also exposed (based on a passage of time). In FIG. 8C, an event pass having a set of days associated therewith illustrates how the display tag changes after each consecutive day passes. Of course, these examples are provided for illustrative purposes only, and not to limit the disclosed subject matter.

One of ordinary skill in the art will appreciate that the tag interrogation may be performed with other than a "read" signal. The reader may be programmed to transmit a "condition" or "transient state" status signal to poll the tag at given time intervals, upon given events at the premises server, or the like. Moreover, the signal used to implement the read may be secured over the wireless link (between reader and tag) using any convenient RFID communication protocol including, without limitation, EPCglobal Class 0, EPCglobal Class 1, and EPCglobal Class 1 Generation 2 (ISO 18000-6A-6C).

The subject disclosure provides significant advantages. As RFID tags and systems become more ubiquitous, it is desirable to be able to provide indications of transient changes in the tags. With the techniques described herein, many types of data and conditions associated with the tags can be made available to the system operator (preferably visually) by simple inspection of the tags, but also to backend systems. In that regard, another aspect of the subject invention is that the reader may be used to read the display indication(s) and to provide such "state" information to the backend RFID systems. Thus, once a first read signal has been read and used to generate the transient state information display, a second read signal may be issued from the reader to determine the outcome of the initial read. In the alternative, the tag itself can provide a response (to the initial read) that indicates the nature of the display output that was generated. This state data is then passed to backend RFID processes. If desired, multiple and subsequent scans may be made to evaluate cumulative alterations of the tag over time.

As noted above, preferably the disclosed method is operative in an RFID tag that includes a processor (or other control circuitry), and program instructions (or their equivalent logic) executable by the processor (or control circuitry) to provide the described functionality. More generally, the invention can take the form of an entirely hardware embodiment, an entirely software embodiment or an embodiment containing both hardware and software elements. In a preferred embodiment, the invention (comprising the tag (client) side functionality, the premises (server) side functionality, or both) is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Preferably, both the reader and tag include computer storage media. The software functions described herein may be implemented in a software module that is downloadable from the reader to the tag (or, more generally, from a server to a client). Thus, according to another embodiment herein, these functions may be implemented in a computer program product, wherein the instructions (or, more generally, program code) are stored in a computer readable storage medium in a data processing system (of the tag) following download over a network from a remote data processing system (of the reader).

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

The invention claimed is:

1. A method of communicating information about a product, the product having a sensor, comprising:
   associating a radio frequency identification (RFID) tag with the product, the RFID tag having a display, the display including a charge-induced pigment release medium that includes multiple overlapping layers of pigment release material;
   in response to receipt, at the RFID tag, of a signal that includes a first value associated with a given characteristic associated with the product, comparing the first value to a second value generated by the sensor in response to receipt of the signal; and
   applying a charge to the charge-induced pigment release medium to display an indication on the display that is a function of the comparison, the indication displaying a piece of information with overlapping indicia.

2. The method as described in claim 1 wherein the given characteristic is one of a set of characteristics that include a temporal characteristic associated with the product, and a physical characteristic associated with the product.

3. The method as described in claim 2 wherein the temporal characteristic is an age of the product.

4. The method as described in claim 3 wherein the first value is a current time and the second value is an expiration date.

5. The method as described in claim 2 wherein the physical characteristic associated with the product is one of: temperature, weight, moisture content, volume and density.

6. The method as described in claim 1 wherein the RFID tag is one of: a passive tag, a semi-passive tag, and an active tag.

7. The method as described in claim 1 wherein the overlapping indicia indicates that the piece of information is no longer valid.

8. An RFID tag, comprising:
   a sensor;
   a display including a charge-induced pigment release medium that includes multiple overlapping layers of pigment release material;
   a processor; and
   a set of program instructions executable by the processor to perform the following method:

in response to receipt of a signal that includes a first value associated with a given characteristic of a product with which the RFID tag is associated, comparing the first value to a second value generated by the sensor in response to receipt of the signal; and applying a charge to the charge-induced pigment release medium to display an indication on the display that is a function of the comparison, the indication displaying a piece of information with overlapping indicia.

9. The RFID tag as described in claim 8 wherein the given characteristic is one of a set of characteristics that include a temporal characteristic, and a physical characteristic.

10. The RFID tag as described in claim 9 wherein the physical characteristic is one of: temperature, weight, moisture content, volume and density.

11. The method as described in claim 8 wherein the charge-induced pigment release medium comprises one of: an electronic ink, and a thermochromic ink.

12. The method as described in claim 11 wherein the electronic ink comprises microcapsules suspended in a fluid, the microcapsules including positively charged particles of a first pigment and negatively charged particles of a second pigment.

13. An RFID system, comprising:
a reader that generates an interrogation signal; and
a set of RFID tags, at least one tag comprising:
a sensor;
a display including a charge-induced pigment release medium that includes multiple overlapping layers of pigment release material;
a processor; and
a set of program instructions executable by the processor to perform the following method:
in response to receipt of the interrogation signal that includes a first value associated with a given characteristic of a product with which the RFID tag is associated, comparing the first value to a second value generated by the sensor in response to receipt of the interrogation signal; and
applying a charge to the charge-induced pigment release medium to display an indication on the display that is a function of the comparison, the indication displaying a piece of information with overlapping indicia.

14. The RFID system as described in claim 13 wherein the charge-induced pigment release medium of the tag display comprises one of: an electronic ink, and a thermochromic ink.

15. The RFID system as described in claim 14 wherein the electronic ink comprises microcapsules suspended in a fluid, the microcapsules including positively charged particles of a first pigment and negatively charged particles of a second pigment.

16. The RFID system as described in claim 13 wherein the given characteristic is one of a set of characteristics that include a temporal characteristic, and a physical characteristic.

17. The RFID system as described in claim 14 wherein the physical characteristic is one of: temperature, weight, moisture content, volume and density.

18. An enterprise RFID system, comprising:
an RFID controller;
one or more RFID readers coupled to the RFID controller;
one or more RFID tags wirelessly coupled to a one of the RFID readers, at least one tag comprising:
a sensor;
a display including a charge-induced pigment release medium that includes multiple overlapping layers of pigment release material;
a processor; and
a set of program instructions executable by the processor to perform the following method:
in response to receipt of an interrogation signal from an RFID reader that includes a first value associated with a given characteristic of a product with which the RFID tag is associated, comparing the first value to a second value generated by the sensor in response to receipt of the interrogation signal; and
applying a charge to the charge-induced pigment release medium to display an indication on the display that is a function of the comparison, the indication displaying a piece of information with overlapping indicia.

19. The enterprise system as described in claim 18 further including an RFID premises server coupled to the RFID controller.

20. The enterprise system as described in claim 19 further including an RFID integration server coupled to the RFID premises server.

21. A computer program product stored in non-transitory computer readable medium including computer program instructions in an RFID tag for carrying out the following method steps in the RFID tag, the RFID tag having a sensor, and a display including a charge-induced pigment release medium that includes multiple overlapping layers of pigment release material;
in response to receipt of a signal that includes a first value associated with a given characteristic, comparing the first value to a second value generated by the RFID tag sensor in response to receipt of the signal; and
applying a charge to the charge-induced pigment release medium to display an indication on the display that is a function of the comparison, the indication displaying a piece of information with overlapping indicia.

22. The computer program product as described in claim 21 wherein the computer program instructions are stored in a non-transitory computer readable storage medium in a remote data processing system associated with an RFID reader, and wherein the computer program instructions were downloaded to the RFID tag over a wireless communication link from the remote data processing system.

23. The computer program product as described in claim 21 wherein the computer program instructions are stored in a non-transitory computer readable storage medium in a server data processing system, and wherein the instructions are downloaded over a wireless communication link to data processing system within the RFID tag for use in a computer readable storage medium within the data processing system within the RFID tag.

24. An RFID tag, comprising:
a sensor;
a display including a charge-induced pigment release medium that includes multiple overlapping layers of pigment release material;
a processor; and
a set of program instructions executable by the processor to perform the following method:
in response to receipt of a signal that includes a first value associated with a given characteristic of a product with which the RFID tag is associated, comparing the first value to a second value generated by the sensor in response to receipt of the signal; and
applying a charge to the charge-induced pigment release medium to display an indication on the display that is a function of the comparison, the indication displaying a piece of information with overlapping indicia.

25. The RFID tag as described in claim 24 wherein the overlapping indicia indicates that the piece of information is no longer valid.

26. The RFID tag as described in claim 24 wherein the charge-induced pigment release medium also includes first and second areas of discrete pigment release material associated with one another, wherein the indication displaying the piece of information with overlapping indicia is located in one of the first and second areas.

* * * * *